United States Patent
Gibson et al.

(10) Patent No.: US 12,406,339 B2
(45) Date of Patent: Sep. 2, 2025

(54) MACHINE LEARNING DATA AUGMENTATION USING DIFFUSION-BASED GENERATIVE MODELS

(71) Applicant: Siemens Healthineers AG, Forchheim (DE)

(72) Inventors: Eli Gibson, Plainsboro, NJ (US); Boris Mailhe, Plainsboro, NJ (US)

(73) Assignee: Siemens Healthineers AG, Forchheim (DE)

( * ) Notice: Subject to any disclaimer, the term of this patent is extended or adjusted under 35 U.S.C. 154(b) by 286 days.

(21) Appl. No.: 18/314,901

(22) Filed: May 10, 2023

(65) Prior Publication Data
US 2024/0378704 A1 Nov. 14, 2024

(51) Int. Cl.
*G06T 5/70* (2024.01)
*G06T 5/10* (2006.01)
*G06T 11/00* (2006.01)

(52) U.S. Cl.
CPC ............... *G06T 5/70* (2024.01); *G06T 5/10* (2013.01); *G06T 11/00* (2013.01); *G06T 2207/20048* (2013.01); *G06T 2207/20081* (2013.01); *G06T 2207/20092* (2013.01); *G06T 2207/30004* (2013.01)

(58) Field of Classification Search
CPC ... G06T 5/70; G06T 5/10; G06T 11/00; G06T 2207/20048; G06T 2207/20081; G06T 2207/20092; G06T 2207/30004
See application file for complete search history.

(56) References Cited

U.S. PATENT DOCUMENTS

| | | | |
|---|---|---|---|
| 2021/0304364 A1 | 9/2021 | Kabaria et al. | |
| 2022/0215510 A1* | 7/2022 | Weinmann | G06T 5/70 |
| 2022/0343142 A1* | 10/2022 | Jiménez Pastor | G16H 30/40 |
| 2024/0169500 A1* | 5/2024 | Zheng | G06T 5/77 |
| 2024/0169622 A1* | 5/2024 | Xie | G06T 11/00 |

FOREIGN PATENT DOCUMENTS

CN 110148088 B * 9/2023 ............. G06T 5/002

OTHER PUBLICATIONS

Zhang et al., "Generalizing Deep Learning for Medical Image Segmentation to Unseen Domains via Deep Stacked Transformation", IEEE Transactions on Medical Imaging, 2020, pp. 2531-2540.
Ramesh et al., "Hierarchical Text-Conditional Image Generation with CLIP Latents", arxiv:2204.06125v1, 2022, pp. 1-27.
(Continued)

*Primary Examiner* — Jason Chan
*Assistant Examiner* — Snigdha Sinha (57) ABSTRACT

Systems and methods for generating augmented images are provided. One or more input medical images are received. At least one of noise and one or more transformations are applied to the one or more input medical images to generate one or more noisy augmented images. The one or more noisy augmented images are denoised using a diffusion-based denoising system to generate one or more denoised augmented images. The applying and the denoising are repeated for one or more iterations using the one or more denoised augmented images as the one or more input medical images to generate one or more final augmented images. The one or more final augmented images are output.

17 Claims, 5 Drawing Sheets

(56) References Cited

OTHER PUBLICATIONS

Rombach et al., "High-Resolution Image Synthesis with Latent Diffusion Models", arxiv:2112.10752v2, 2022, pp. 1-45.

Pinaya et al., "Brain Imaging Generation with Latent Diffusion Models", arxiv:2209.07162v1, 2022, pp. 1-10.

Sohl-Dickstein et al., "Deep Unsupervised Learning using Nonequilibrium Thermodynamics", arxiv:1503.03585v8, 2015, 18 pgs.

Ho et al., "Denoising Diffusion Probabilistic Models", arxiv:2006.11239v2, 2020, pp. 1-25.

Song et al., "Denoising Diffusion Implicit Models", arxiv:2010.02502v4, 2022, pp. 1-22.

Banitalebi-Dehkordi et al., "Repaint: Improving the Generalization of Down-Stream Visual Tasks by Generating Multiple Instances of Training Examples", arxiv:2110.10366v1, 2021, pp. 1-28.

Extended European Search Report (EESR) mailed Sep. 24, 2024 in counterpart European Patent Application No. 24174841.7.

Pouria Rouzrokh et al: "Multitask Brain Tumor Inpainting with Diffusion Models: A Methodological Report", arxiv.org, Cornell University Library, Cornell University Ithaca, NY 14853, Oct. 21, 2022 (Oct. 21, 2022), * pp. 1-15 *.

Julia Wolleb et al: "Diffusion Models for Implicit Image Segmentation Ensembles", arxiv.org, Cornell University Library, 201 Olin Library Cornell University Ithaca, NY 14853, Dec. 6, 2021 (Dec. 6, 2021), * pp. 1-2 *.

Goceri Evgin: "Medical image data augmentation: techniques, comparisons and interpretations", Artificial Intelligence Review, vol. 56, No. 11, Mar. 20, 2023 (Mar. 20, 2023), pp. 12561-12605, NL ISSN: 0269-2821, DOI: 10.1007/s10462-023-10453; abstract; * p. 12585-p. 12590 *.

* cited by examiner

Receive one or more input medical images
202

↓

Apply at least one of noise and one or more transformations to the one or more input medical images to generate one or more noisy augmented images
204

↓

Denoise the one or more noisy augmented images using a diffusion-based denoising system to generate one or more denoised augmented images
206

↓

Repeat steps 204 and 206 for one or more iterations using the one or more denoised augmented images as the one or more input medical images to generate one or more final augmented images
208

↓

Output the one or more final augmented images
210

↓

Train a machine learning based model for performing a medical imaging analysis task based on the output images
212

MACHINE LEARNING DATA AUGMENTATION USING DIFFUSION-BASED GENERATIVE MODELS

TECHNICAL FIELD

The present invention relates generally to ML (machine learning)/AI (artificial intelligence) based data augmentation, and in particular to ML/AI data augmentation using diffusion-based generative models.

BACKGROUND

The performance of ML/AI based models is highly dependent on the quality and volume of training data. In clinical practice, ML/AI based models have been applied for performing a variety of medical imaging analysis tasks, such as, e.g., segmentation, classification, detection, quantification, etc. However, the acquisition and annotation of training data for training such ML/AI based models for performing medical imaging analysis tasks is costly and heterogenous between manufacturers, centers, and acquisition protocols. Further, only a subset of available training data may have appropriate clinical characteristics for training a given model and often this subset of available data may only represent a subset of manufacturers, centers, and acquisition protocols.

Conventionally, training data sets for training such ML/AI based models for performing medical imaging analysis are augmented by perturbing real data to generate synthetic data in a controlled manner. However, such conventional augmentation techniques can introduce artifacts that shift the domain and distribution of the training data sets. For example, rotation-based augmentation can introduce interpolation, boundary, and scale artifacts, intensity-based augmentation can introduce unrealistic noise patterns, and pathology-synthesis-based augmentation can introduce unrealistic transitions between healthy and pathological tissues.

BRIEF SUMMARY OF THE INVENTION

In accordance with one or more embodiments, systems and methods for generating augmented images are provided. One or more input medical images are received. At least one of noise and one or more transformations are applied to the one or more input medical images to generate one or more noisy augmented images. The one or more noisy augmented images are denoised using a diffusion-based denoising system to generate one or more denoised augmented images. The applying and the denoising are repeated for one or more iterations using the one or more denoised augmented images as the one or more input medical images to generate one or more final augmented images. The one or more final augmented images are output.

In one embodiment, applying at least one of noise and one or more transformations to the one or more input medical images to generate one or more noisy augmented images comprises applying the one or more transformations to the one or more input medical images to generate one or more transformed input medical images, adding the noise to the one or more transformed input medical images to generate the one or more noisy augmented images, and generating an uncertainty map of uncertainty introduced by the one or more transformations and the noise. The uncertainty map may be generated based on a difference between 1) the one or more transformed input medical images and 2) the one or more noisy augmented images. In one embodiment, the one or more noisy augmented images are denoised using the diffusion-based denoising system based on the uncertainty map.

In one embodiment, regions masked by the noise is imputed during a first pass of the denoising and local texture features are captured during a second pass of the denoising.

In one embodiment, the one or more transformations are randomly applied to the one or more input medical images within a user-defined parameter.

In one embodiment, a machine learning based model is trained for performing a medical imaging analysis task based on the one or more final augmented images.

In one embodiment, the diffusion-based denoising system comprises at least one of a diffusion probabilistic model, a DDPM (denoising diffusion probabilistic model), and a DDIM (denoising diffusion implicit model).

These and other advantages of the invention will be apparent to those of ordinary skill in the art by reference to the following detailed description and the accompanying drawings.

DETAILED DESCRIPTION

The present invention generally relates to methods and systems for machine learning data augmentation using diffusion-based generative models. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Various augmentation techniques have been proposed for augmenting training data sets for training ML/AI based models. However, conventional augmentation techniques can introduce artifacts that shift the domain and distribution of the training data set.

In accordance with embodiments described herein, diffusion-based generative models are utilized for augmentation of training data for training ML/AI based models for performing medical imaging analysis tasks. Embodiments described herein apply a diffusion-based denoising system and a refinement noising system for generating augmented medical images from real images according to an iterative refinement process. The iterative refinement of the augmented medical images result in images having image properties that are consistent with the distribution of the real images but without the artifacts commonly introduced by convention augmentation techniques.

Figure 1:
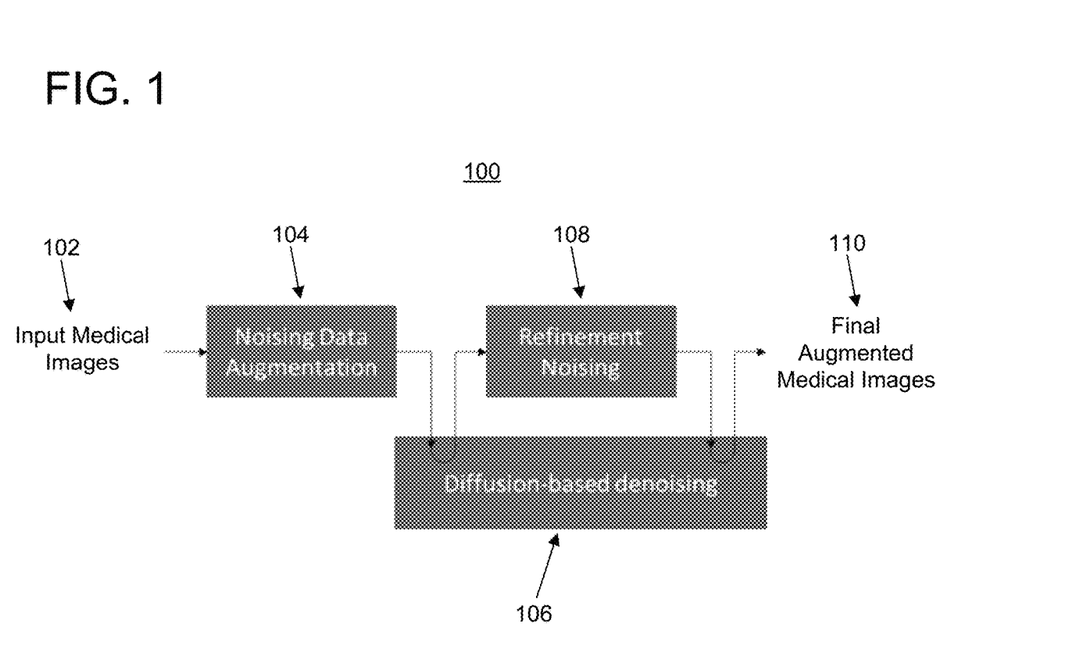
FIG. 1 shows a workflow for generating one or more augmented images, in accordance with one or more embodiments.

FIG. 1 shows a workflow 100 for generating one or more augmented images, in accordance with one or more embodiments. Certain elements of workflow 100 (e.g., systems 104, 106, and/or 108) may be implemented using one or more suitable computing devices, such as, e.g., computer 502 of FIG. 5.

As shown in FIG. 1, workflow 100 comprises noising data augmentation system 104, diffusion-based denoising system 106, and refinement noising system 108. Noising data augmentation system 104 receives as input one or more input medical images and applies noise and one or more pseudo-random transformations (e.g., rotation or resampling) to the input medical images to generate one or more noisy augmented images. Diffusion-based denoising system 106 receives the noisy augmented images as input and at least partially denoises the noisy augmented images to generate one or more denoised augmented images that are consistent with the transformations applied by noising data augmentation system 104. Refinement noising system 108 receives the denoised augmented images as input and optionally applies further transformations and/or noise to generate one or more refined augmented images. Diffusion-based denoising system 106 receives the refined augmented images and at least partially denoises the refined augmented images to generate one or more final augmented images 110. Refinement noising system 108 and diffusion-based denoising system 106 may be iteratively applied on final augmented images 110 for one or more additional iterations.

Advantageously, final augmented images 110 are consistent with the transformations applied by noising data augmentation system 104 and/or refinement noising system 108 and have imaging properties that are with the distribution of input medical images 102. By iteratively refining the augmented images by applying refinement noising system 108 (for applying further transformations and/or noise) and diffusion-based denoising system 106 (for denoising the refined image) for one or more iterations, small variations to the images are introduced at each iteration to enable incremental imputation of masked regions, thereby resulting in realistic looking augmented images.

Figure 2:
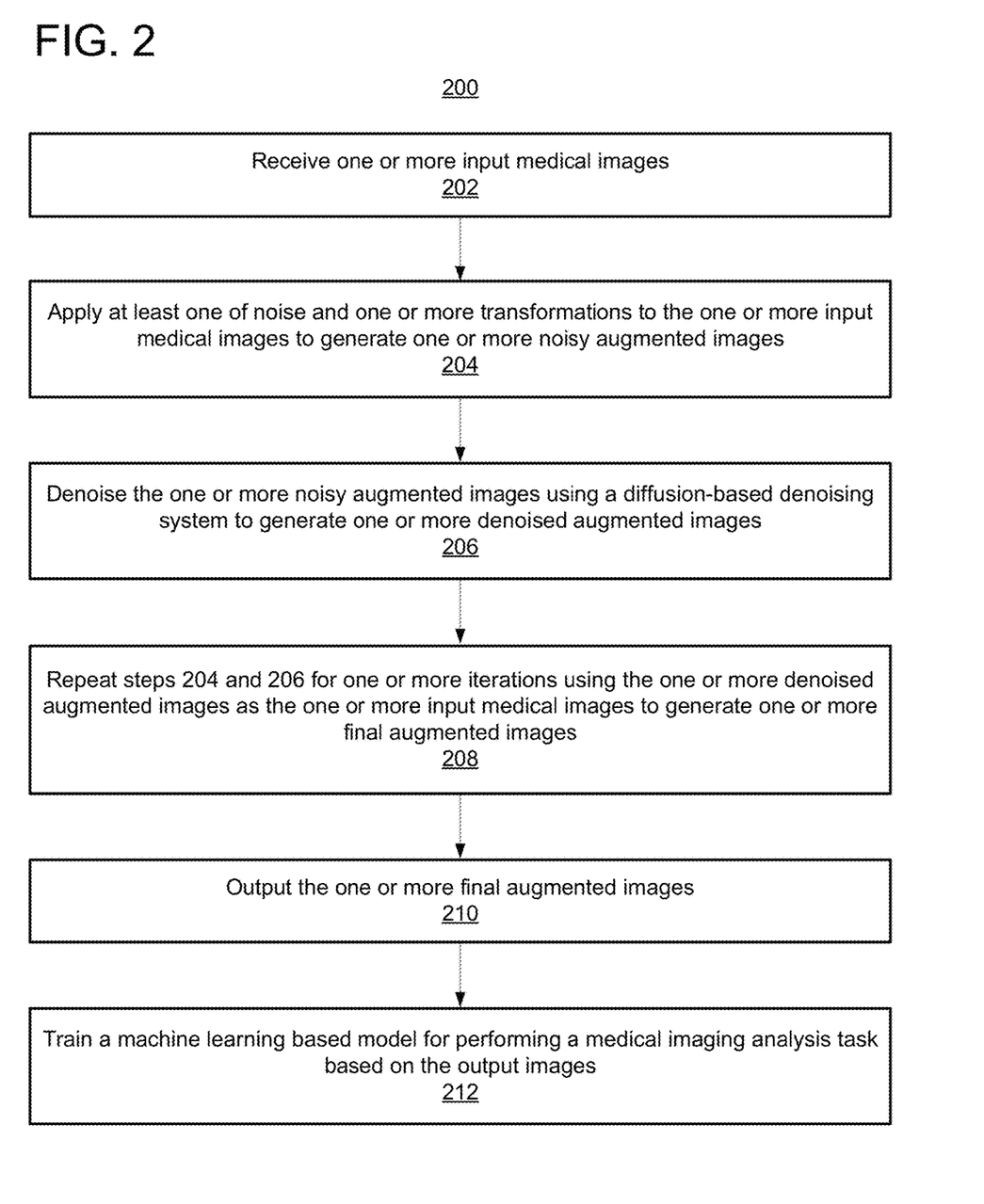
FIG. 2 shows a method for generating one or more augmented images, in accordance with one or more embodiments.

FIG. 2 shows a method 200 for generating one or more augmented images, in accordance with one or more embodiments. FIG. 2 will be described with reference to workflow 100 of FIG. 1. The steps of method 200 may be performed by one or more suitable computing devices, such as, e.g., computer 502 of FIG. 5.

At step 202 of FIG. 2, one or more input medical images are received. In one example, as shown in workflow 100 of FIG. 1, the input medical images are input medical images 102. The input medical images are real images of a patient. In one embodiment, the input medical images comprise a plurality of input medical images of a same imaging study.

The input medical images may be of any suitable modality, such as, e.g., CT (computed tomography), MRI (magnetic resonance imaging), US (ultrasound), x-ray, or any other medical imaging modality or combinations of medical imaging modalities. The input medical images may be 2D (two dimensional) images and/or 3D (three dimensional) volumes, and may comprise a single input medical image or a plurality of input medical images. Accordingly, reference herein to a pixel of a 2D image equally refers to voxels of a 3D volume. The input medical images may be received directly from an image acquisition device, such as, e.g., a CT scanner, as the medical images are acquired, by loading previously acquired medical images from a storage or memory of a computer system, or by receiving the medical images from a remote computer system.

At step 204 of FIG. 2, at least one of noise and one or more transformations are applied to the one or more input medical images to generate one or more noisy augmented images. In one example, as shown in workflow 100 of FIG. 1, the noise and the one or more initial transformations are applied on input medical images 102 by noising data augmentation system 104.

The noise may comprise any suitable noise, such as, e.g., Gaussian noise, salt and pepper noise, speckle noise, etc. The noise is applied to the input medical images resulting in masked portions of the input medical images. Such masked portions may mask undesirable structures, artifacts, or regions in the input medical images. The transformations may comprise any suitable image augmentation transformation. Examples of such image augmentation transformation may comprise geometric transformations (e.g., rotation, deformation, resampling), color space transformations (intensity transformation), kernel filters, mixing images, random erasing, feature space transformations, pathology synthesis, etc.

The transformations may be applied to the input medical images in any suitable manner. In one embodiment, the initial transformations are randomly applied to the input medical images (e.g., by randomly rotating the input medical images or by inserting lesions in random regions of the input medical images). In another embodiment, the initial transformations are applied to the input medical images based on user-defined parameters (e.g., by rotating the input medical images according to a user-defined degree of rotation or by inserting lesions in user-defined regions of the input medical images). In another embodiment, the initial transformations are applied to the input medical images based on parameters extracted from medical data (e.g., by inserting lesions in regions of the input medical images based on a spatial distribution of lesions in a database of lesions). In a further embodiment, the initial transformations are applied to the input medical images in a pseudo-random manner, for example, by randomly applying the initial transformations within some user-defined parameters (e.g., by randomly rotating the input medical images within a user-defined range) or by randomly applying the initial transformations based on parameters extracted from medical data (e.g., by inserting the lesions in regions of the input medical images that are randomly sampled according to the spatial distribution).

In one embodiment, the noisy augmented images are generated by first applying the transformations to the input medical images to generate transformed input medical images. The noise is then added to the transformed input medical images to generate the noisy augmented images. In addition to applying the transformations and the noise, an uncertainty map of uncertainty introduced by the transformation and the noise is generated. The uncertainty map is computed, for example, as the Gaussian log-likelihood of the noise, i.e., the squared absolute difference between the transformed input medical images and the noisy augmented images. In one embodiment, the uncertainty map is a voxel-wise (or pixel-wise) uncertainty map, where each respective voxel in the uncertainty map has an intensity value ranging between, e.g., 0 to 1 representing an uncertainty associated with that respective voxel. However, the uncertainty map may be in any other suitable form. The uncertainty map may be calculated based on the interpolation of the transformations. In one example, where the transformations comprise rotation and/or deformation transformations, the rotation and/or deformation transformations may be applied in regions outside of the image space of the input medical images. Such regions would have high uncertainty in the uncertainty map. In another example, where the at least one transformation comprises a pathology synthesis transformation, the pathology synthesis transformation may have high uncertainty in regions at the boundary of the synthetic pathology, medium uncertainty within the synthetic pathology, and low uncertainty in regions distant from the synthetic pathology in the uncertainty map. In a further example, where the at least one transformation comprises an interpolation transformation, the interpolation transformation may be low uncertainty where the interpolated voxel is relatively close to a voxel center of the input medical images and high uncertainty where the interpolated voxel is relatively far from the voxel center of the input medical images in the uncertainty map.

At step 206 of FIG. 2, the one or more noisy augmented images are denoised using a diffusion-based denoising system to generate one or more denoised augmented images. In one example, as shown in workflow 100 of FIG. 1, the noisy augmented images generated by noising data augmentation system 104 are denoised by diffusion-based denoising system 106.

The diffusion-based denoising system may be implemented based on a 2D or 3D diffusion model trained to support the desired distribution of the input medical images. For example, the diffusion model may be a diffusion probabilistic model, a DDPM (denoising diffusion probabilistic model), or a DDIM (denoising diffusion implicit model). However, the diffusion model may be implemented in accordance with any other diffusion-based architecture.

The diffusion-based denoising system reverses a diffusion process which progressively adds noise to an image in a series of T denoising steps. In one embodiment, the diffusion-based denoising is separated into two passes. In a first pass of the diffusion-based denoising, the diffusion model is executed from step T to step tm. In the second pass of the diffusion-based denoising, the diffusion model is executed from step tm to step 11. The first pass captures the most challenging aspects of the denoising, such as, e.g., imputation of missing regions (e.g., regions masked by the noise) of the images and long-distance correlations, and thus involves a larger number of short steps for stability. By imputing missing regions in the noisy augmented images, the diffusion-based denoising system generates new imaging data in the regions masked by the noise. The second pass captures local textural features, involves a smaller number of steps, and is faster to execute. In one embodiment, the first pass computes an intermediate latent representation in a smaller dimension (e.g., an image with lower resolution) to reduce the cost of the large number of steps, and the second pass expands the dimension from the small dimension of the intermediate latent representation to the target dimension. In another embodiment, the diffusion-based denoising system denoises the noisy augmented images in the first pass and no further processing is performed.

In one embodiment, the noisy augmented images are denoised based on the uncertainty map. In this embodiment, the diffusion model introduces constraints, e.g., through the formulation of the conditional probability distribution or through additional algorithmic steps, to further constrain the output of the denoised augmented images using the uncertainty map. In particular, the information present in the input medical images is guaranteed to be preserved in the generated denoised augmented images by conditioning the diffusion to the constraint that the input medical images can be recovered from the final augmented medical images (generated at step 208 of FIG. 2) by inverting the transformations. This constraint results in an extra least-square gradient during diffusion if the transformations are linear.

Depending on the constraints, the first pass of the diffusion-based denoising can be executed during a prior offline stage while the second pass can be executed during an online stage during training with different noise added by the refinement noising system (applied at step 208 of FIG. 2). If the diffusion-based denoising system is implemented with a DDPM, the diffusion-based denoising system will produce a different image each instance of execution because DDPM performs noising during its own execution, resulting in further data augmentation.

In one embodiment, where the noisy augmented images are in different coordinate systems (for example, where the input medical images are of an imaging study with different coordinate systems), the diffusion-based denoising system includes an intermediate latent representation which is resampled to an image-specific coordinate system (e.g., a coordinate system of the target denoised augmented images or a corresponding lower resolution coordinate system). The coordinate system of the intermediate latent representation can be defined relative to an original image from the input medical images, an image derived via data augmentation, or an anatomical reference.

At step 208 of FIG. 2, steps 204 and 206 are repeated for one or more iterations using the one or more denoised augmented images as the one or more input medical images to generate one or more final augmented images. In one example, as shown in workflow 100 of FIG. 1, step 204 is repeated to apply the transformations by refinement noising system 108 and step 206 is repeated to denoise the noisy augmented images by diffusion-based denoising system 106. By iteratively repeating steps 204 and 206, noise is incrementally added at each iteration of step 204 and the masked regions are incrementally imputed at each iteration of step 206, thereby iteratively refining the augmented images to generate realistic looking images.

In one embodiment, the noise applied to the input medical images at the repetition of step 204 comprises an appropriate level of noise. In another embodiment, the one or more transformations applied to the input medical images at the repetition of step 204 comprise transformations, such as, e.g., resampling the denoised augmented images to different coordinate grids that do not introduce substantial uncertainty. The noise and transformations applied during the repetition of step 204 (by refinement noising system 108 of FIG. 1) can belong to the same categories as the noise and transforms applied during the first iteration of step 204 (by noising data augmentation system 104 of FIG. 1) but constrained to have a smaller effect on images (e.g., perform rotations by a relatively smaller angle only.)

At step 210 of FIG. 2, the one or more final augmented images are output. In one embodiment, only the final augmented images generated at the last iteration of step 208 are output. In another embodiment, one or more of 1) the denoised augmented images generated at step 206 and 2) the final augmented images generated at certain (e.g., each) iterations of step 208 are output. The images can be output by displaying the final augmented images on a display device of a computer system, storing the images on a memory or storage of a computer system, or by transmitting the images to a remote computer system.

At step 212 of FIG. 2, a machine learning based model is trained for performing a medical imaging analysis task based on the output images. In one example, the machine learning based model is trained based on the final augmented images generated at the last iteration of step 208. In another example, the machine learning based model is trained based on one or more of 1) the denoised augmented images generated at step 206 and 2) the final augmented images generated at certain (e.g., each) iterations of step 208. The output images may augment the training data set used for training the machine learning based model. The medical imaging analysis task may be, for example, segmentation, classification, detection, quantification, or any other suitable medical imaging analysis task.

Advantageously, method 200 enables the generation of realistic looking final augmented images that have characteristics that are consistent with the distribution of the input medical images and that do not have artifacts that may be introduced with conventional data augmentation techniques. Further, the iterative repetition of steps 204 and 206 enables the rapid generation of augmented medical images that, while are similar structurally, are different images.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based models, as well as with respect to methods and systems for training machine learning based models. Features, advantages or alternative embodiments herein can be assigned to the other claimed objects and vice versa. In other words, claims for methods and systems for training a machine learning based model can be improved with features described or claimed in context of the methods and systems for utilizing a trained machine learning based model, and vice versa.

In particular, the trained machine learning based models applied in embodiments described herein can be adapted by the methods and systems for training the machine learning based models. Furthermore, the input data of the trained machine learning based model can comprise advantageous features and embodiments of the training input data, and vice versa. Furthermore, the output data of the trained machine learning based model can comprise advantageous features and embodiments of the output training data, and vice versa.

In general, a trained machine learning based model mimics cognitive functions that humans associate with other human minds. In particular, by training based on training data, the trained machine learning based model is able to adapt to new circumstances and to detect and extrapolate patterns.

In general, parameters of a machine learning based model can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based model can be adapted iteratively by several steps of training.

In particular, a trained machine learning based model can comprise a neural network, a support vector machine, a decision tree, and/or a Bayesian network, and/or the trained machine learning based model can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 3:
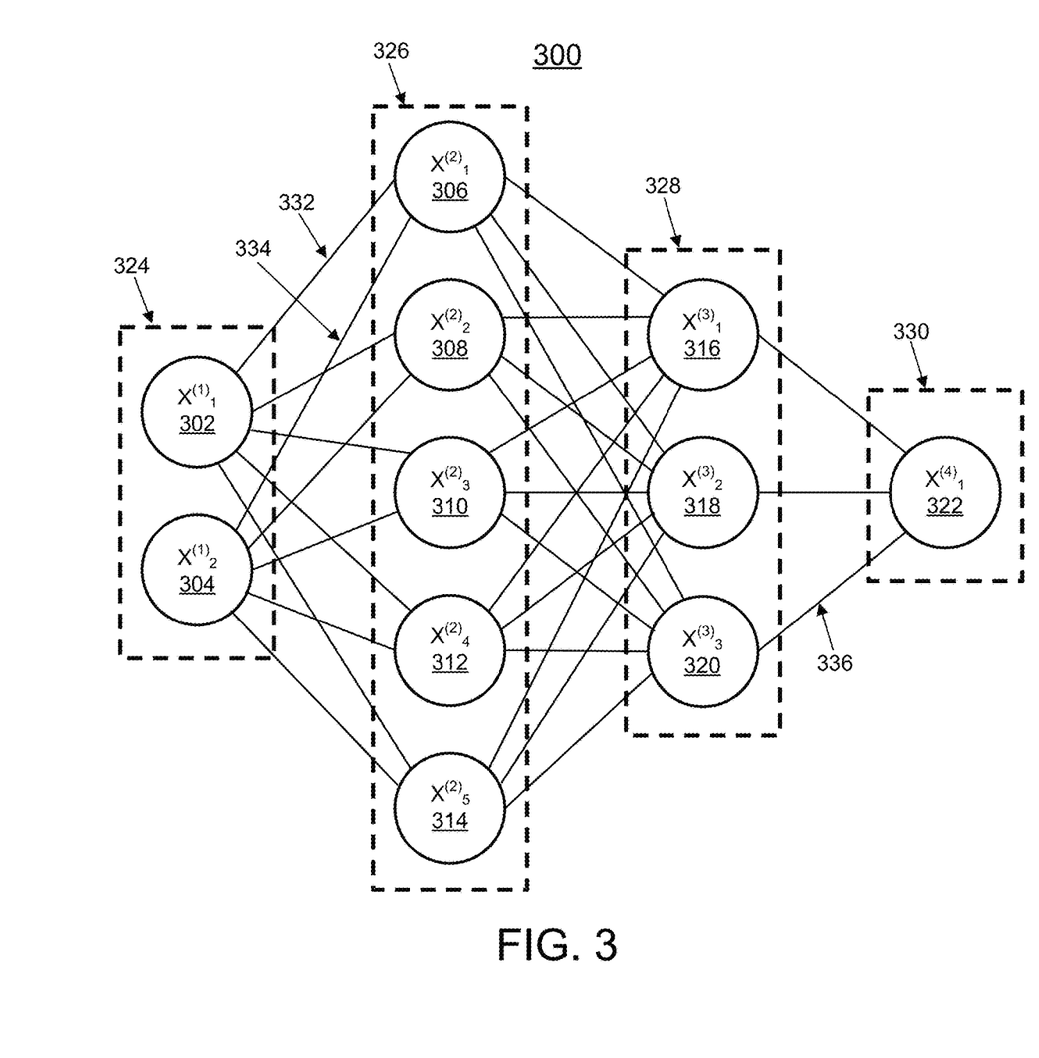
FIG. 3 shows an exemplary artificial neural network that may be used to implement one or more embodiments.

FIG. 3 shows an embodiment of an artificial neural network 300, in accordance with one or more embodiments. Alternative terms for "artificial neural network" are "neural network", "artificial neural net" or "neural net". Machine learning networks described herein, such as, e.g., diffusion-based denoising system 106 of FIG. 1 and the diffusion-based denoising system utilized at step 206 and the machine learning based model utilized at step 212 of FIG. 2, may be implemented using artificial neural network 300.

The artificial neural network 300 comprises nodes 302-322 and edges 332, 334, . . . , 336, wherein each edge 332, 334, . . . , 336 is a directed connection from a first node 302-322 to a second node 302-322. In general, the first node 302-322 and the second node 302-322 are different nodes 302-322, it is also possible that the first node 302-322 and the second node 302-322 are identical. For example, in FIG. 3, the edge 332 is a directed connection from the node 302 to the node 306, and the edge 334 is a directed connection from the node 304 to the node 306. An edge 332, 334, . . . , 336 from a first node 302-322 to a second node 302-322 is also denoted as "ingoing edge" for the second node 302-322 and as "outgoing edge" for the first node 302-322.

In this embodiment, the nodes 302-322 of the artificial neural network 300 can be arranged in layers 324-330, wherein the layers can comprise an intrinsic order introduced by the edges 332, 334, . . . , 336 between the nodes 302-322. In particular, edges 332, 334, . . . , 336 can exist only between neighboring layers of nodes. In the embodiment shown in FIG. 3, there is an input layer 324 comprising only nodes 302 and 304 without an incoming edge, an output layer 330 comprising only node 322 without outgoing edges, and hidden layers 326, 328 in-between the input layer 324 and the output layer 330. In general, the number of hidden layers 326, 328 can be chosen arbitrarily. The number of nodes 302 and 304 within the input layer 324 usually relates to the number of input values of the neural network 300, and the number of nodes 322 within the output layer 330 usually relates to the number of output values of the neural network 300.

In particular, a (real) number can be assigned as a value to every node 302-322 of the neural network 300. Here, $x^{(n)}_i$ denotes the value of the i-th node 302-322 of the n-th layer 324-330. The values of the nodes 302-322 of the input layer 324 are equivalent to the input values of the neural network 300, the value of the node 322 of the output layer 330 is equivalent to the output value of the neural network 300. Furthermore, each edge 332, 334, . . . , 336 can comprise a weight being a real number, in particular, the weight is a real number within the interval $[-1, 1]$ or within the interval $[0, 1]$. Here, $w^{(m,n)}_{i,j}$ denotes the weight of the edge between the i-th node 302-322 of the m-th layer 324-330 and the j-th node 302-322 of the n-th layer 324-330. Furthermore, the abbreviation $w^{(n)}_{i,j}$ is defined for the weight $w^{(n,n+1)}_{i,j}$.

In particular, to calculate the output values of the neural network 300, the input values are propagated through the neural network. In particular, the values of the nodes 302-322 of the (n+1)-th layer 324-330 can be calculated based on the values of the nodes 302-322 of the n-th layer 324-330 by $$x_j^{(n+1)} = f\left(\sum_i x_i^{(n)} \cdot w_{i,j}^{(n)}\right).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 324 are given by the input of the neural network 300, wherein values of the first hidden layer 326 can be calculated based on the values of the input layer 324 of the neural network, wherein values of the second hidden layer 328 can be calculated based in the values of the first hidden layer 326, etc.

In order to set the values $w^{(m,n)}_{i,j}$ for the edges, the neural network 300 has to be trained using training data. In particular, training data comprises training input data and training output data (denoted as $t_i$). For a training step, the neural network 300 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 300 (backpropagation algorithm). In particular, the weights are changed according to $$w_{i,j}^{\prime(n)} = w_{i,j}^{(n)} - \gamma \cdot \delta_j^{(n)} \cdot x_i^{(n)}$$

wherein γ is a learning rate, and the numbers $\delta^{(n)}_j$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta^{(n+1)}_j$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 330, wherein f' is the first derivative of the activation function, and $y^{(n+1)}_j$ is the comparison training value for the j-th node of the output layer 330.

Figure 4:
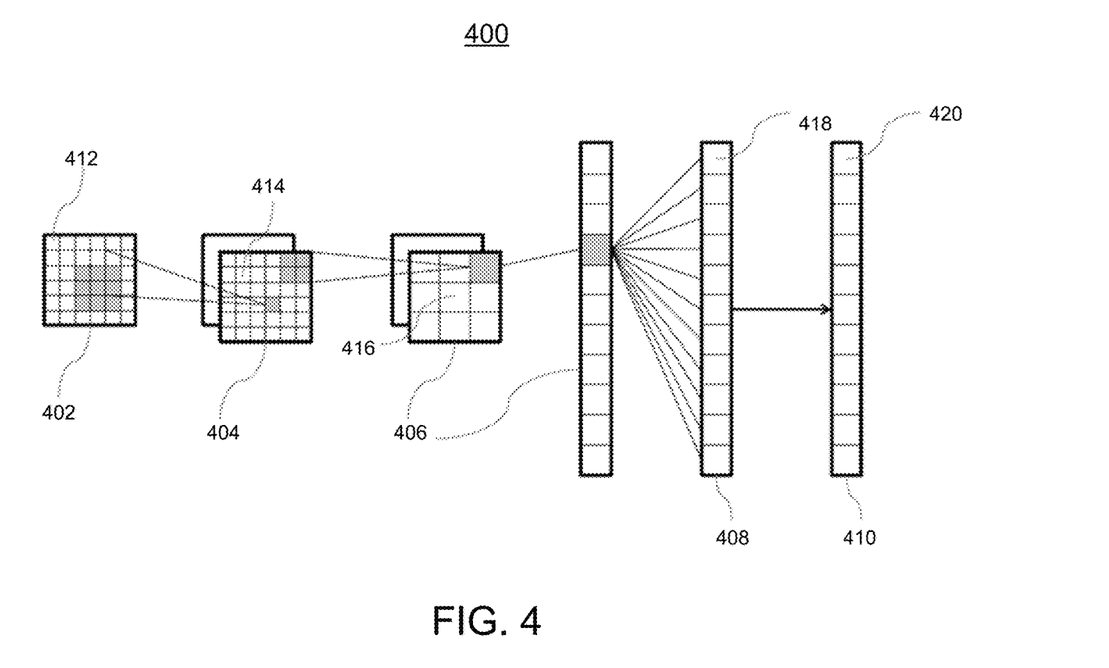
FIG. 4 shows a convolutional neural network that may be used to implement one or more embodiments.

FIG. 4 shows a convolutional neural network 400, in accordance with one or more embodiments. Machine learning networks described herein, such as, e.g., diffusion-based denoising system 106 of FIG. 1 and the diffusion-based denoising system utilized at step 206 and the machine learning based model utilized at step 212 of FIG. 2, may be implemented using convolutional neural network 400.

In the embodiment shown in FIG. 4, the convolutional neural network comprises 400 an input layer 402, a convolutional layer 404, a pooling layer 406, a fully connected layer 408, and an output layer 410. Alternatively, the convolutional neural network 400 can comprise several convolutional layers 404, several pooling layers 406, and several fully connected layers 408, as well as other types of layers. The order of the layers can be chosen arbitrarily, usually fully connected layers 408 are used as the last layers before the output layer 410.

In particular, within a convolutional neural network 400, the nodes 412-420 of one layer 402-410 can be considered to be arranged as a d-dimensional matrix or as a d-dimensional image. In particular, in the two-dimensional case the value of the node 412-420 indexed with i and j in the n-th layer 402-410 can be denoted as $x^{(n)}_{[i,j]}$. However, the arrangement of the nodes 412-420 of one layer 402-410 does not have an effect on the calculations executed within the convolutional neural network 400 as such, since these are given solely by the structure and the weights of the edges.

In particular, a convolutional layer 404 is characterized by the structure and the weights of the incoming edges forming a convolution operation based on a certain number of kernels. In particular, the structure and the weights of the incoming edges are chosen such that the values $x^{(n)}_k$ of the nodes 414 of the convolutional layer 404 are calculated as a convolution $x^{(n)}_k = K_k * x^{(n-1)}$ based on the values $x^{(n-1)}$ of the nodes 412 of the preceding layer 402, where the convolution * is defined in the two-dimensional case as $$x_k^{(n)}[i, j] = (K_k * x^{(n-1)})[i, j] = \sum_{i'}\sum_{j'} K_k[i', j'] \cdot x^{(n-1)}[i - i', j - j'].$$

Here the k-th kernel $K_k$ is a d-dimensional matrix (in this embodiment a two-dimensional matrix), which is usually small compared to the number of nodes 412-418 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 412-420 in the respective layer 402-410. In particular, for a convolutional layer 404, the number of nodes 414 in the convolutional layer is equivalent to the number of nodes 412 in the preceding layer 402 multiplied with the number of kernels.

If the nodes 412 of the preceding layer 402 are arranged as a d-dimensional matrix, using a plurality of kernels can be interpreted as adding a further dimension (denoted as "depth" dimension), so that the nodes 414 of the convolutional layer 404 are arranged as a (d+1)-dimensional matrix. If the nodes 412 of the preceding layer 402 are already arranged as a (d+1)-dimensional matrix comprising a depth dimension, using a plurality of kernels can be interpreted as expanding along the depth dimension, so that the nodes 414 of the convolutional layer 404 are arranged also as a (d+1)-dimensional matrix, wherein the size of the (d+1)-dimensional matrix with respect to the depth dimension is by a factor of the number of kernels larger than in the preceding layer 402.

The advantage of using convolutional layers 404 is that spatially local correlation of the input data can exploited by enforcing a local connectivity pattern between nodes of adjacent layers, in particular by each node being connected to only a small region of the nodes of the preceding layer.

In embodiment shown in FIG. 4, the input layer 402 comprises 36 nodes 412, arranged as a two-dimensional 6×6 matrix. The convolutional layer 404 comprises 72 nodes 414, arranged as two two-dimensional 6×6 matrices, each of the two matrices being the result of a convolution of the values of the input layer with a kernel. Equivalently, the nodes 414 of the convolutional layer 404 can be interpreted as arranges as a three-dimensional 6×6×2 matrix, wherein the last dimension is the depth dimension.

A pooling layer 406 can be characterized by the structure and the weights of the incoming edges and the activation function of its nodes 416 forming a pooling operation based on a non-linear pooling function f. For example, in the two dimensional case the values $x^{(n)}$ of the nodes 416 of the pooling layer 406 can be calculated based on the values $x^{(n-1)}$ of the nodes 414 of the preceding layer 404 as $$x^{(n)}[i, j] = f(x^{(n-1)}[id_1, jd_2], \ldots, x^{(n-1)}[id_1 + d_1 - 1, jd_2 + d_2 - 1])$$

In other words, by using a pooling layer 406, the number of nodes 414, 416 can be reduced, by replacing a number d1·d2 of neighboring nodes 414 in the preceding layer 404 with a single node 416 being calculated as a function of the values of said number of neighboring nodes in the pooling layer. In particular, the pooling function f can be the max-function, the average or the L2-Norm. In particular, for a pooling layer 406 the weights of the incoming edges are fixed and are not modified by training.

The advantage of using a pooling layer 406 is that the number of nodes 414, 416 and the number of parameters is reduced. This leads to the amount of computation in the network being reduced and to a control of overfitting.

In the embodiment shown in FIG. 4, the pooling layer 406 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 408 can be characterized by the fact that a majority, in particular, all edges between nodes 416 of the previous layer 406 and the nodes 418 of the fully-connected layer 408 are present, and wherein the weight of each of the edges can be adjusted individually.

In this embodiment, the nodes 416 of the preceding layer 406 of the fully-connected layer 408 are displayed both as two-dimensional matrices, and additionally as non-related nodes (indicated as a line of nodes, wherein the number of nodes was reduced for a better presentability). In this embodiment, the number of nodes 418 in the fully connected layer 408 is equal to the number of nodes 416 in the preceding layer 406. Alternatively, the number of nodes 416, 418 can differ.

Furthermore, in this embodiment, the values of the nodes 420 of the output layer 410 are determined by applying the Softmax function onto the values of the nodes 418 of the preceding layer 408. By applying the Softmax function, the sum the values of all nodes 420 of the output layer 410 is 1, and all values of all nodes 420 of the output layer are real numbers between 0 and 1.

A convolutional neural network 400 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 400 can be trained based on the backpropagation algorithm. For preventing overfitting, methods of regularization can be used, e.g. dropout of nodes 412-420, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1 or 2. Certain steps or functions of the methods and workflows described herein, including one or more of the steps or functions of FIG. 1 or 2, may be performed by a server or by another processor in a network-based cloud-computing system. Certain steps or functions of the methods and workflows described herein, including one or more of the steps of FIG. 1 or 2, may be performed by a client computer in a network-based cloud computing system. The steps or functions of the methods and workflows described herein, including one or more of the steps of FIG. 1 or 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1 or 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 5:
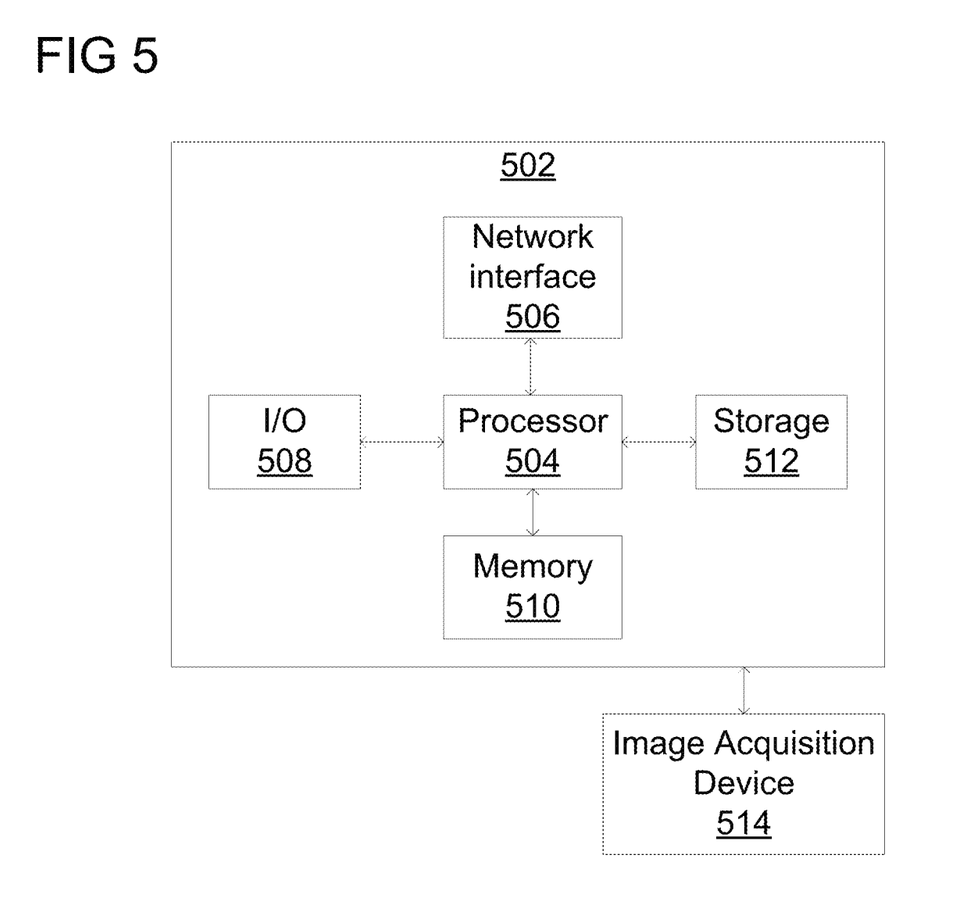
FIG. 5 shows a high-level block diagram of a computer that may be used to implement one or more embodiments.

A high-level block diagram of an example computer 502 that may be used to implement systems, apparatus, and methods described herein is depicted in FIG. 5. Computer 502 includes a processor 504 operatively coupled to a data storage device 512 and a memory 510. Processor 504 controls the overall operation of computer 502 by executing computer program instructions that define such operations. The computer program instructions may be stored in data storage device 512, or other computer readable medium, and loaded into memory 510 when execution of the computer program instructions is desired. Thus, the method and workflow steps or functions of FIG. 1 or 2 can be defined by the computer program instructions stored in memory 510 and/or data storage device 512 and controlled by processor 504 executing the computer program instructions. For example, the computer program instructions can be implemented as computer executable code programmed by one skilled in the art to perform the method and workflow steps or functions of FIG. 1 or 2. Accordingly, by executing the computer program instructions, the processor 504 executes the method and workflow steps or functions of FIG. 1 or 2. Computer 502 may also include one or more network interfaces 506 for communicating with other devices via a network. Computer 502 may also include one or more input/output devices 508 that enable user interaction with computer 502 (e.g., display, keyboard, mouse, speakers, buttons, etc.).

Processor 504 may include both general and special purpose microprocessors, and may be the sole processor or one of multiple processors of computer 502. Processor 504 may include one or more central processing units (CPUs), for example. Processor 504, data storage device 512, and/or memory 510 may include, be supplemented by, or incorporated in, one or more application-specific integrated circuits (ASICs) and/or one or more field programmable gate arrays (FPGAs).

Data storage device 512 and memory 510 each include a tangible non-transitory computer readable storage medium. Data storage device 512, and memory 510, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 508 may include peripherals, such as a printer, scanner, display screen, etc. For example, input/output devices 508 may include a display device such as a cathode ray tube (CRT) or liquid crystal display (LCD) monitor for displaying information to the user, a keyboard, and a pointing device such as a mouse or a trackball by which the user can provide input to computer 502.

An image acquisition device 514 can be connected to the computer 502 to input image data (e.g., medical images) to the computer 502. It is possible to implement the image acquisition device 514 and the computer 502 as one device. It is also possible that the image acquisition device 514 and the computer 502 communicate wirelessly through a network. In a possible embodiment, the computer 502 can be located remotely with respect to the image acquisition device 514.

Any or all of the systems and apparatus discussed herein may be implemented using one or more computers such as computer 502.

One skilled in the art will recognize that an implementation of an actual computer or computer system may have other structures and may contain other components as well, and that FIG. 5 is a high level representation of some of the components of such a computer for illustrative purposes.

Independent of the grammatical term usage, individuals with male, female or other gender identities are included within the term.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method comprising:
  receiving one or more input medical images;
  applying at least one of noise and one or more transformations to the one or more input medical images to generate one or more noisy augmented images, wherein applying the at least one of the noise and the one or more transformations comprises generating an uncertainty map of uncertainty introduced by the at least one of the noise and the one or more transformations;
  denoising the one or more noisy augmented images using a diffusion-based denoising system based on the uncertainty map to generate one or more denoised augmented images;
  repeating the applying and the denoising for one or more iterations using the one or more denoised augmented images as the one or more input medical images to generate one or more final augmented images; and
  outputting the one or more final augmented images.

2. The computer-implemented method of claim 1, wherein applying at least one of noise and one or more transformations to the one or more input medical images to generate one or more noisy augmented images comprises:
  applying the one or more transformations to the one or more input medical images to generate one or more transformed input medical images; and
  adding the noise to the one or more transformed input medical images to generate the one or more noisy augmented images.

3. The computer-implemented method of claim 2, wherein generating an uncertainty map of uncertainty introduced by the at least one of the noise and the one or more transformations comprises:
  generating the uncertainty map based on a difference between 1) the one or more transformed input medical images and 2) the one or more noisy augmented images.

4. The computer-implemented method of claim 1, wherein denoising the one or more noisy augmented images using a diffusion-based denoising system based on the uncertainty map to generate one or more denoised augmented images comprises:
  imputing regions masked by the noise during a first pass of the denoising; and
  capturing local texture features during a second pass of the denoising.

5. The computer-implemented method of claim 1, wherein applying at least one of noise and one or more transformations to the one or more input medical images to generate one or more noisy augmented images comprises:
  randomly applying the one or more transformations to the one or more input medical images within a user-defined parameter.

6. The computer-implemented method of claim 1, further comprising:
  training a machine learning based model for performing a medical imaging analysis task based on the one or more final augmented images.

7. The computer-implemented method of claim 1, wherein the diffusion- based denoising system comprises at least one of a diffusion probabilistic model, a DDPM (denoising diffusion probabilistic model), and a DDIM (denoising diffusion implicit model).

8. An apparatus comprising:
  means for receiving one or more input medical images;
  means for applying at least one of noise and one or more transformations to the one or more input medical images to generate one or more noisy augmented images, wherein the means for applying the at least one of the noise and the one or more transformations comprises means for generating an uncertainty map of uncertainty introduced by the at least one of the noise and the one or more transformations;
  means for denoising the one or more noisy augmented images using a diffusion-based denoising system based on the uncertainty map to generate one or more denoised augmented images;
  means for repeating the applying and the denoising for one or more iterations using the one or more denoised augmented images as the one or more input medical images to generate one or more final augmented images; and
  means for outputting the one or more final augmented images.

9. The apparatus of claim 8, wherein the means for applying at least one of noise and one or more transformations to the one or more input medical images to generate one or more noisy augmented images comprises:
  means for applying the one or more transformations to the one or more input medical images to generate one or more transformed input medical images; and
  means for adding the noise to the one or more transformed input medical images to generate the one or more noisy augmented images.

10. The apparatus of claim 9, wherein the means for generating an uncertainty map of uncertainty introduced by the at least one of the noise and the one or more transformations comprises:
  means for generating the uncertainty map based on a difference between 1) the one or more transformed input medical images and 2) the one or more noisy augmented images.

11. The apparatus of claim 8, wherein the means for denoising the one or more noisy augmented images using a diffusion-based denoising system based on the uncertainty map to generate one or more denoised augmented images comprises:
  means for imputing regions masked by the noise during a first pass of the denoising; and
  means for capturing local texture features during a second pass of the denoising.

12. The apparatus of claim 8, wherein the means for applying at least one of noise and one or more transformations to the one or more input medical images to generate one or more noisy augmented images comprises:
  means for randomly applying the one or more transformations to the one or more input medical images within a user-defined parameter.

13. A non-transitory computer readable medium storing computer program instructions, the computer program instructions when executed by a processor cause the processor to perform operations comprising:
  receiving one or more input medical images;
  applying at least one of noise and one or more transformations to the one or more input medical images to generate one or more noisy augmented images, wherein applying the at least one of the noise and the one or more transformations comprises generating an uncertainty map of uncertainty introduced by the at least one of the noise and the one or more transformations;
  denoising the one or more noisy augmented images using a diffusion-based denoising system based on the uncertainty map to generate one or more denoised augmented images;
  repeating the applying and the denoising for one or more iterations using the one or more denoised augmented images as the one or more input medical images to generate one or more final augmented images; and
  outputting the one or more final augmented images.

14. The non-transitory computer readable medium of claim 13, wherein applying at least one of noise and one or more transformations to the one or more input medical images to generate one or more noisy augmented images comprises:
  applying the one or more transformations to the one or more input medical images to generate one or more transformed input medical images; and
  adding the noise to the one or more transformed input medical images to generate the one or more noisy augmented images.

15. The non-transitory computer readable medium of claim 14, wherein generating an uncertainty map of uncertainty introduced by the at least one of the noise and the one or more transformations comprises:
  generating the uncertainty map based on a difference between 1) the one or more transformed input medical images and 2) the one or more noisy augmented images.

16. The non-transitory computer readable medium of claim 13, the operations further comprising:
  training a machine learning based model for performing a medical imaging analysis task based on the one or more final augmented images.

17. The non-transitory computer readable medium of claim 13, wherein the diffusion-based denoising system comprises at least one of a diffusion probabilistic model, a DDPM (denoising diffusion probabilistic model), and a DDIM (denoising diffusion implicit model).

* * * * *